United States Patent [19]

Houle

[11] Patent Number: 4,949,375
[45] Date of Patent: Aug. 14, 1990

[54] AUTOMATIC POSITIVE TELEPHONE DISCONNECT SYSTEM

[76] Inventor: Joseph D. G. Houle, 79 Hobart Crescent, Nepean, Ontario, Canada, K2H 5S3

[21] Appl. No.: 337,414

[22] Filed: Apr. 13, 1989

[30] Foreign Application Priority Data

Nov. 3, 1988 [CA]  Canada .................................. 582133

[51] Int. Cl.$^5$ ........................................... H04M 1/00
[52] U.S. Cl. ..................................... 379/199; 379/35; 379/379
[58] Field of Search ................ 379/387, 372, 373, 377, 379/422, 424, 441, 442

[56] References Cited

U.S. PATENT DOCUMENTS

| | | | |
|---|---|---|---|
| 3,614,334 | 10/1971 | Bonvallet | 379/424 |
| 3,715,514 | 2/1973 | Bell, Jr. | 379/7 |
| 4,156,799 | 5/1979 | Cave. | |
| 4,326,104 | 4/1982 | Bergida | 379/377 |
| 4,675,901 | 6/1987 | Smith et al. | 379/442 |
| 4,837,819 | 6/1989 | McClain | 379/424 |

Primary Examiner—Jin F. Ng
Assistant Examiner—Jhancy Augustus
Attorney, Agent, or Firm—Nixon & Vanderhye

[57] ABSTRACT

The invention represents an automatic positive disconnect circuit for controlling the connection of a communication device having two signal conducting lines and sensing means for indicating the mode of said communication device. The circuit is designed to positively disconnect the first and second lines of the communication device when the latter is in the non-operating mode, to filter selected frequencies when in the operating mode, and to permit said communication device to otherwise operate in a normal manner whenever a call is received or a call is initiated.

13 Claims, 3 Drawing Sheets

AUTOMATIC POSITIVE TELEPHONE DISCONNECT SYSTEM

The invention relates to a circuit to guard against the use of a two-line communication device as an electronic device for surreptitious monitoring, for example, listening to private conversations, obtaining electronic data from electronic data processing equipment, and the like.

Certain components in a two-line communication device can modulate voice signals even when not in active use, that is, when the communication device is a telephone for instance and it is in the on-hook mode. Those components when in the on-hook mode may act as a microphone and can pick up acoustic vibrations which represent voice signals. These voice signals can then be intercepted from the two lines and be reproduced by a signal processor. In the case of electronic data, the electronic components may act as an antenna and the electromagnetic radiation produced by the operation of electronic data processing equipment are picked up by that antenna and transmitted over the two lines. As with the voice signals, the signals representing electronic data can also be intercepted and reproduced.

Accordingly, if a two-line communication device is present in a room where confidential information is discussed or electronically processed, the two-line communication device becomes a security hazard because the voice or data signals are susceptible of being intercepted.

Thus there is a need for a device to isolate the lines of a two-line communication device when in the non-operating mode and to provide protection against the interception of data processed signals in the operating mode by pressing selected frequencies.

The aim of the invention is to provide a means in the form of an electronic circuit to isolate the lines of a two-line communication device when it is in the non-operating mode, to filter certain frequencies in the operating mode and for said device to otherwise function as a normal two-line communication device.

A circuit embodying the present invention may be interfaced, i.e. inserted on the two lines of the communication device. The circuit is designed to positively disconnect the first and second lines of the communication device when the latter is in the non-operating mode, to filter selected frequencies when in the operating modes and to permit said communication device to otherwise operate in a normal manner whenever a call is initiated or a call is received. In other words, the present invention appears transparent to incoming or outgoing signals generated during normal usage of the communication device as intended.

The automatic positive disconnect circuit of applicant's invention is used to control the connection electronically of the first and second lines of a two-line communication device. The invention represents an automatic positive disconnect circuit for controlling the connection of a communication device having two signal conducting lines and sensing means for indicating the mode of said communication device, said disconnect circuit comprising; a first relay means operable to connect said two lines of said communication device; a second relay means operable to connect said two lines of said communication device in response to an AC ring signal carried by said two lines; a first control means operable selectively to disable and enable said first relay means dependent upon the mode of said communication device as indicated by said sensing means; and a second control means including an optically isolated ring detector for detecting an AC ring signal, said second control means being operable to disable said second relay means in response to an AC ring signal carried by said two lines.

For a more complete understanding of the present invention and the advantages thereof, reference is now made to the following description, taken in conjunction with the accompanying drawings is which:

Figure 1:
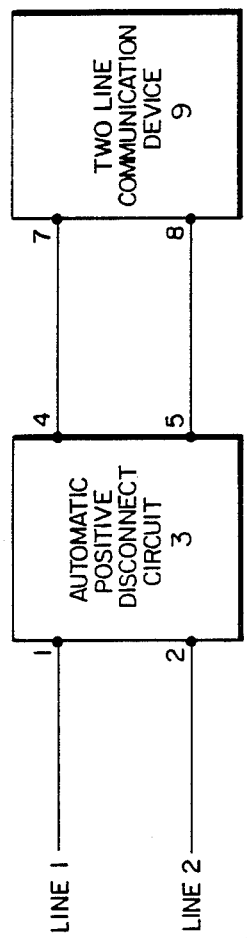
FIG. 1 shows figuratively a block diagram of a two-wire communication system with the automatic positive disconnect circuit of this invention in place.

FIG. 1 shows an automatic positive disconnect circuit 3 according to the present invention connected to a communication device 9 by two signal conducting lines. The two signal conducting lines provide an input at connection points 1 and 2 of the disconnect circuit 3 with the line that provides input at point 1 being referred to as the first line and the line which provides input at point 2 being referred to as the second line. The first and second outputs at connection points 4 and 5 respectively of the disconnect circuit 3 are connected by two conventional signal conducting lines to first and second input points 7 and 8 respectively of the communication device 9. Without the present invention in place the first and second lines would directly input at input points 7 and 8 of the communication device 9. The communication device 9 has a conventional sensing means (not shown) for indicating the mode of said communication device 9, i.e., whether it is in operation or not.

The disconnect circuit 3 controls the electrical connection of the first and second lines to the communication device 9 depending upon the mode of its sensing means. When the sensing means of the communication device 9 indicates a non-operating condition, the first and second line inputs at points 7 and 8 of the communication device need to be disconnected, i.e. isolated from the lines of the two line communication system. Hence the communication device 9 is positively disconnected from the first and second lines by the disconnect circuit 3, since there is no signal path from points 1 and 2. If an incoming AC ring signal is received while the communication device 9 is disconnected, the disconnect circuit 3 must reconnect the first and second lines at first and second input points 7 and 8 of the communication device. The communication device 9 should then operate in a normal manner. If the communication device 9 has been put into use and an outgoing signal generated, the sensing means will indicate the operating condition of the communication device 9. The first and second line inputs at points 1 and 2 of the disconnect circuit 3 must at that time be electrically connected to the communication device 9 at first and second input points 7 and 8.

Figure 2:
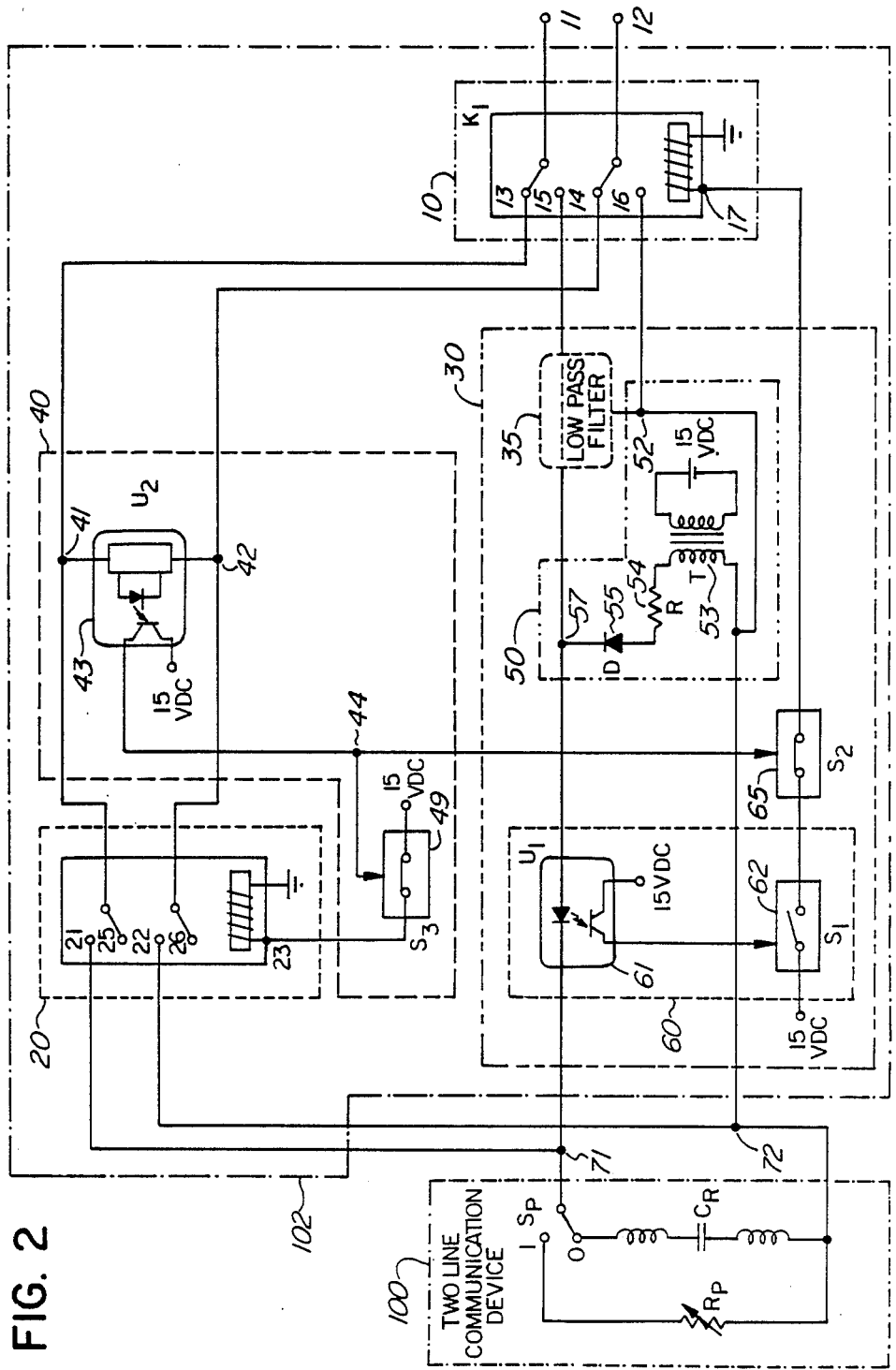
FIG. 2 shows a schematic diagram of one embodiment of the automatic positive disconnect circuit as used in a conventional telephone system.

Turning now to FIG. 2, there is shown a functional diagram of a first embodiment of the present invention in a standard telephone 100 which represents the communication device of a two-line communication system. A disconnect circuit 102 is comprised of first and second relay means 10 and 20, and a first and a second control means 30 and 40. The first relay means 10 has the first and second lines of said two line communication system as input at connection points 11 and 12. The first relay means 10 has four output terminals 13, 14, 15, 16 and one enable/disable input point 17.

When the first relay means 10 receives a disable signal at input point 17 the input from first and second lines at points 11 and 12 is outputed to a first output terminal 13 and second output terminal 14 respectively. The enable/disable signal at point 17 is provided by first control means 30. The first and second output points 13 and 14 are connected to first and second input points 41 and 42 of the second control means 40 by two signal conducting lines as shown. The first and second outputs of the second control means 40 are inputed to first and second points 25 and 26 of the second relay means 20. A control signal is outputed from the second control means 40 at point 44. A signal conducting line is connected from point 44 to a third switch means shown at 49. Such a switch means may be in the form of an analogue switch, a field effect transistor (FET) or functionally equivalent device.

When the switch 49 is disabled (i.e. the communication device 100 is receiving a call) by the control signal, the switch 49 is opened, the signal path from the DC voltage source to point 23 is disabled and the second relay means 20 is now disabled. The first and second input signals at points 41 and 42 of the second relay means 20 are carried to the communication device 100 at its first and second input points 71 and 72 by two signal conducting lines through first and second output points 21 and 22 of second relay means 20, again as shown in the drawings. Thus, when a call is received, the first and second input points 11 and 12 are connected to the communication device 100 through input points 71 and 72 via the second control means 40, and the second relay means 20. Hence the disconnect circuit 102 becomes transparent to the incoming ring signal and the communication device 100 functions in its normal manner.

When the third switch 49 is enabled (i.e. the communication device 100 is not receiving a call) by a control signal, switch 49 is closed, the DC voltage source to point 23 is also enabled and the second relay means 20 is consequently enabled. Hence the first and second inputs of the second relay means 20 at points 41 and 42 are not carried to input points 71 and 72 of the communication device 100, and the communication device is positively disconnected. This negative logic circuitry allows for normal operation of the communication device 100 in the event of a power failure.

When the first relay means 10 receives an enable signal from first control means 30 at point 17, which occurs when a call is initiated at communication device (telephone) 100, the outgoing call signal will be carried by the first and second lines to points 11 and 12. When the call is initiated at telephone 100 the outgoing call signal from points 71 and 72 is passed by a current detecting means 61 which activates a first switch means 62. Subsequently, first relay means 10 is enabled, with the two output lines now being connected to points 15 and 16. The third and fourth outputs 15 and 16 of the first relay means 10 are input at points 52 and 57 of the first control means 30.

When the sensing means represented by a switch hook in the communication device 100 indicates the on-hook or non-operating condition, the first control means 30 is disabled and consequently relay means 10 is also disabled. Hence, the communication device 100 is positively disconnected from the input points 11 and 12. When the sensing means of telephone 100 indicates an off-hook or operating condition to the first control means 30, the third and fourth output points 15 and 16 are connected to input points 71 and 72 respectively. Thus the communication device 100 has been connected to said first and second lines and can function in a normal manner.

Each portion of the disconnect circuit 102 will now be described in more detail. The second control means 40 is comprised of a ring detector means 43 and a third switch 49 with inputs at connection points 41 and 42 from the first and second outputs of the first relay means 10. The ring detector means 43 must be in the form of an optocoupler (opto-isolator) in order to break any conductive path between communication device 100 and the two lines of the communication system of which that device is a part. The ring detector means 43 operates to detect an AC ring signal coming into points 11 and 12. In the non-operating mode of the communication device 100 the first and second lines pass through points 13 and 14 of the first relay means 10, the ring signal to the inputs of said ring detector means 43 at points 41 and 42. When the AC ring signal is received, the ring detector means 43 is activated which initiates a control signal at point 44. The DC voltage source to point 23 is consequently disabled due to the opening of third switch 49 in response to the control signal. Thus the second relay means 20 is disabled and the first and second inputs of the second relay means 20 at points 41 and 42 are connected to the first and second inputs 71 and 72 of the communication device 100 through the first and second outputs of the second relay means 20 at points 21 and 22. When there is no AC ring signal incoming, the normally enabled ring detector means 43 generates a control signal at point 44 which keeps relay means 20 enabled. Hence, the communication device 100 is again positively disconnected.

The first control means 30 is comprised of a means 50 for generating a current source, a detecting means 60 responsive to the flow of DC current and a second analogue switch 65, (the same as switch 49), and has input points 57 and 52 from third and fourth output points 15 and 16 of the first relay means 10. A low pass filter 35 is inserted between points 57 and 15. This low pass filter 35 is designed to attenuate the high frequency signals emanating, for instance, from electronic data processing equipment which could be picked up by communication device 100, during operation of that equipment. The means 50 for generating the DC current further comprises a transformer means 53 and a diode means 55 interconnected through a load resistor 54. The diode 55 is connected in series with the transformer means 53 and resistor 54 and is operable to prevent capacitance charge in said communication device 100 from discharging through the first control means 30. This prevents the disconnect circuit 102 from becoming destabilized.

The detecting means 60 includes a current detector means 61 and a first analogue switch 62 (again, the same as switch 49). The current detector means 61 is preferably an optocoupler (opto-isolator) so as to minimize current drain from the two-line communication system. A signal conducting line connects the output point of the current detector means 61 to first switch 62. A DC voltage source is connected to the point 17 of first relay means 10 via first switch means 62 and second switch means 65. When the telephone's sensing means indicates an operating mode of the telephone, i.e. communication device 100, current flows from point 57 of the first control means 30 to point 71. The current detector 61 detects said current flow and closes the first switch 62. The second switch 65 is controlled by the second control means 40. A current conducting line connects point 44 with the second switch 65. When no AC ring signal is being received, the second switch 65 is in a closed position. Thus a current path is formed through the now closed switch 62 and normally closed switch 65 between the DC voltage source and point 17 of the first relay means 10. When the first relay means 10 is enabled, the third and fourth outputs of the relay means 10 are connected to first and second input points 71 and 72 of the communication device 100. When the switch hook, i.e. the telephone's condition sensing means indicates an on-hook, non-operating condition, no current flow is detected by current detector 61 and the first switch 62 is opened. Thus, no conductive path is formed between the communication device 100 and the input points 11 and 12. Again the communication device 100 is positively disconnected from the distant parts of the two line communication system.

There are four conditions which the combination of the communication device and the positive disconnect circuit may encounter. The operation of the present invention is explained in each situation.

1. NON-OPERATING

When the sensing means (telephone switch hook in this embodiment) indicates a non-operating mode no current is detected by the current detector 61, and the first relay means 10 is disabled. DC current from the transformer 53, which functions as a line isolation transformer, cannot flow because of the on-line capacitor used in the sensing means of the communication device 100. The second relay means 20 is only activated if an AC ring signal is received.

2. A CALL IS INITIATED

When the switch hook sensing means indicates an operating mode, DC current from transformer 53 flows between point 57 and 71 of the first control means 30 which enables the current detector 61. This closes the switch 62 and creates a current path from the DC voltage source to point 17. That then enables the first relay means 10 which connects input points 11 and 12 to points 71 and 72 respectively. The DC current from point 11 will flow through a resistive component of the communication device 100, as shown, and keep the current detector 61 activated throughout the operation of the communication device.

3. A CALL IS TERMINATED

When the switch hook sensing means indicates that the switch hook has been closed, i.e., it is now in a non-operating mode, the DC current flow stops. Since no current is detected by the current detector 61, the first switch 62 opens and the first relay means 10 is disabled, that is the third and fourth output points 15, 16 are disconnected from input points 11 and 12. Thus the communication device 100 is positively disconnected from the first and second lines of the two line communication system.

4. A CALL IS RECEIVED

When an AC ring signal is received and passes to first outputs 14 and 13 of the relay means 10, the ring detector 43 is activated and a control signal is generated from point 44. That output control signal causes the second and third switches 65 and 49 to be opened. This disables the second relay means 20 to relay its first and second inputs to the first and second inputs of the communication device 100. When the switch hook sensing means indicates an operating condition, i.e. the call is answered, the call initiation sequence is started.

It is noted that the positive disconnect circuit here above described lends itself to manufacture as an integrated chip which can readily be located within the housing of a standard telephone, modem, facsimile device or other two-line communication device.

Figure 3:
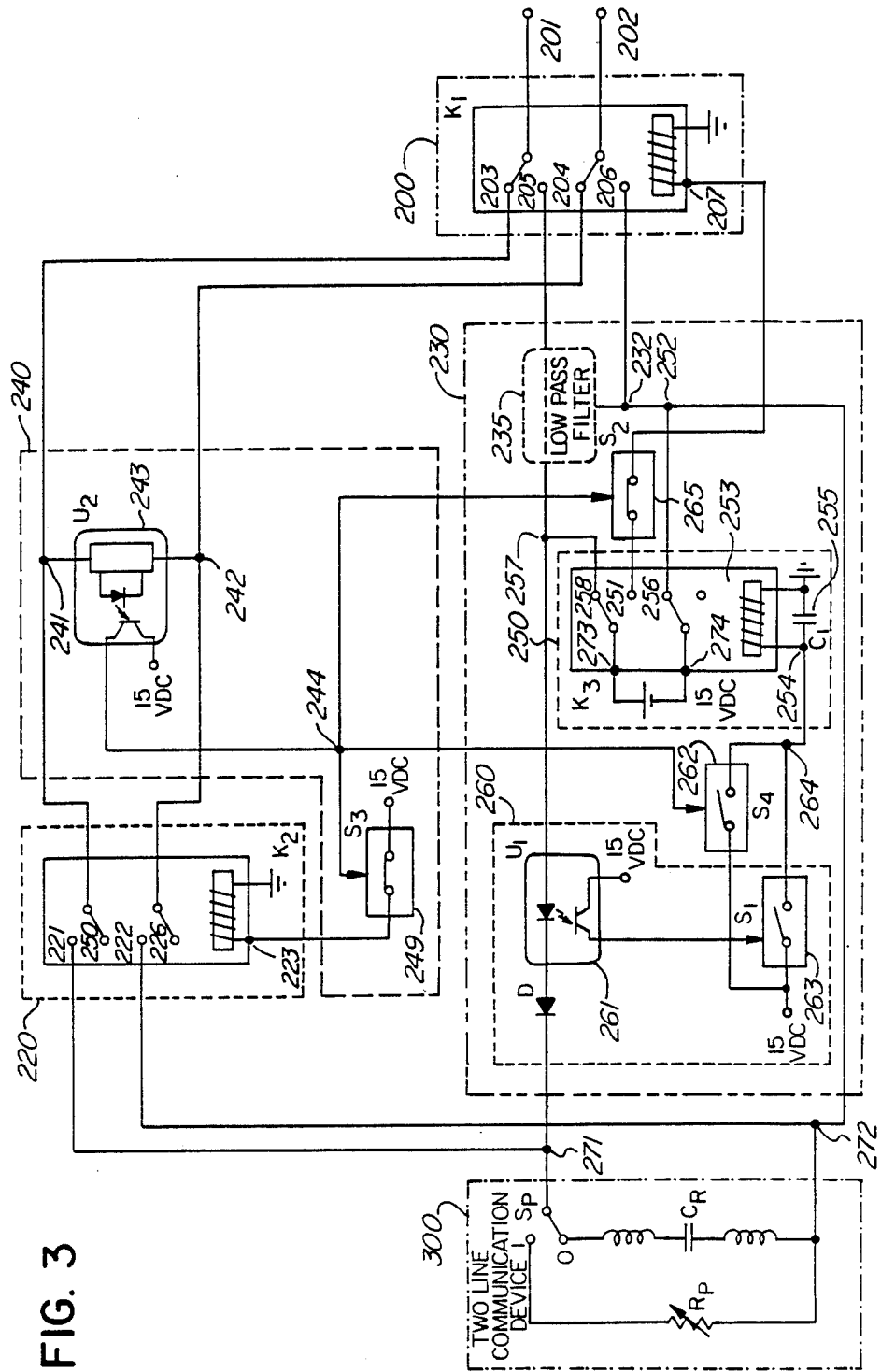
FIG. 3 shows a schematic diagram of a second embodiment of the automatic positive disconnect circuit of this invention again as used in a common telephone system.

Turning now to another embodiment of the invention, FIG. 3 shows a functional diagram of a second version of the present invention, again used in a telephone which represents a two-line communication device 300. The change between the first and second embodiments of the invention resides in the means for controlling the current flow in the first control means. To refer to that difference in the second embodiment, therefore, a first control means 230 includes a third relay means 253 and a fourth switch 262. This control means 230 is functionally identical to the first control means 30 of FIG. 2. In this embodiment the transformer means 53 of FIG. 2 has been eliminated.

The first control means 230 further includes a means 250 for controlling the current flow therein, and a current detecting means 260 responsive to the switch hook sensing means of the communication device 300. The means 250 for controlling the current is further comprised of the third relay means 253 and a capacitive component 255 connected thereto as shown. The detecting means 260 is further comprised of a current detector 261 and first analogue switch 263 (once again the same as switch 49 of FIG. 2). These are connected and function in the same manner as detector and switches 61 and 63 of FIG. 2.

Thus, the first and second lines of the two-line communication system provide input at points 201 and 202 respectively of a first relay means 200. Output from third and fourth point 205 and 206 of the first relay means 200 are input to the first control means 230 at first and second points 257 and 232 respectively. Note that control means 230 is responsive to the condition indicated by the switch hook sensing means of communication device 300.

When the first control means 230 has been activated a control signal from the first control means 230 is provided to point 207 of the first relay means 200. When an enable signal is received from the first control means 230, the inputs at points 201 and 202 are output from the first relay means 200 via points 205 and 206 thereof. When a disable signal is received from the first control means 230, the inputs at points 201 and 202 are output from the first relay means 200 at its points 203 and 204. When an operating mode is indicated by the switchhook sensing means, the first relay means 200 is enabled and if a non-operating mode is indicated, the relay means 200 is disabled.

The switch hook sensing means of the communication device 300 indicates the condition by opening or closing a DC current path from input point 271 of the communication device. A DC voltage source is connected between input points 273 and 274 of the third relay means 253. This DC voltage source generates a current flow when the switch hook sensing means is in the operating mode.

When the switch hook sensing means indicates an in-operation condition, current flow is detected by the current detector 261. The first switch 263 is closed in response to that current flow, forming a current path from the Dc voltage source to the third relay means 253 via point 254. When current is received at point 254 the DC voltage source connects with third output of the third relay means 253 and provides a current flow to point 207 through the normally closed second switch 265. The only time the second switch 265 is opened is when the second control means 240 receives a ring signal. Both an in-operation mode and ring signal would not be indicated at the same time. When the switch hook sensing means indicates a non-use condition, no current flows and none is detected by the current detector 261. The first switch 263 remains held open. Thus no current path is formed from point 251 to point 207 and the first relay means 200 is disabled.

In order to isolate first control means 230 from the ring signal coming from second control means 240, a fourth analog switch 262 is used to enable third relay means. Consequently the voltage source connected to inputs 273 and 274 becomes isolated from points 267 and 252 when an AC ring signal is received. The second analog switch 265 opens when a ring signal is received from second control means 240; this keeps first relay means 200 disabled. Capacitive means 255 is used to create a small delay to make sure that second analog switch 265 is activated before the fourth analog switch 262, thus keeping the circuit stable.

The third relay means 253 has an input at point 254 from point 264. When either the first switch 263 or the fourth switch 262 is closed, the third relay means 253 is enabled and the output at point 251 is activated. When both the first and fourth switches 263 and 262 are opened, the third relay means 253 is disabled and the first and second points 256 and 258 are connected to the voltage source.

Parts of the positive disconnect circuit of this invention are currently available as integrated chips. A PC Board-Use Relay Model G6A from the company OMRON may be used as the first, second, and third relay means described herein. An INTERSIL DG 212 4 channel Analog Switch may similarly be used as the first, second, and third switch means, INTERSIL DG 211 may be used as the fourth switch means. The current detector and the ring detector may take the form of a Hewlet Packard DC and AC LOGIC interface optocoupler, with the ring detector being AC and the current detector being DC activated.

In view of the present day technology the invention described above can be designed on one Integrated Chip and can be mounted in the interior of the housing of the communication device such as a common telephone, modem, facsimile copier or other such device.

The positive disconnect circuit of this invention is not affected by, and does not itself affect other features of a telephone version of the communication device, such as call forwarding or call waiting.

It is understood that the invention herein is described in specific respects for purposes of this description. It is also understood that such respects are merely illustrative of the application of the principles of the invention. Numerous arrangements may be devised by those skilled in the art without departing from the spirit and scope of the invention.

The embodiments of the invention in which an exclusive property or privilege is claimed are defined as follows:

1. An automatic positive disconnect circuit for controlling the connection of a communication device having two signal conducting lines and also having sensing means for indicating the condition of said communication device, said disconnect circuit comprising:
    a first relay means operable to electronically connect said two lines to said communication device;
    a second relay means operable to electronically connect said two lines to said communication device in response to an AC ring-signal carried by said two lines;
    a first control means operable selectively to disable and enable said first relay means dependent upon the mode of said communication device indicated by said sensing means, said first control means comprising a current detector for detecting any current that flows in response to said condition of said sensing means, an isolation transformer means for controlling the current flow in said first control means, a first switch means responsive to said current detector for enabling said first relay means, a second switch means for disabling said first relay means in response to an AC ring-signal received by first and second lines, and a diode connected in series with said isolation transformer means operable to prevent an equivalent capacitance charge in said communication device from discharging through said first control means;
    said disconnect circuit further comprising a second control means including an optically isolated ring detector for detecting an AC ring-signal, said second control means being operable to disable said second relay means in response to an AC ring-signal carried by said two lines.

2. The automatic positive disconnect circuit of claim 1 wherein said current detector is a current detector with an optical interface.

3. The automatic positive disconnect circuit of claim 1 further comprising a low pass filter means, connected between said first control means and said first relay means for passing selected frequencies.

4. An automatic positive disconnect circuit of claim 1 where the first control means comprises:
    a current detector for detecting any current that flows in response to said condition of said sensing means;
    a third relay means operable to enable said first relay means;
    a first switch means responsive to said current detector for enabling said third relay means by enabling the current detected by said current detector to flow to said first relay means;
    a capacitive component connected between a ground and input to the third relay means, for keeping said third relay means stable; a second switch for isolating said first relay means in response to an AC ring signal received by said two signal conducting lines; and
    a fourth switch means for isolating said first control means in response to a AC ring signal received by said two signal conducting lines.

5. The automatic positive disconnect circuit of claim 4 wherein said current detector is a current detector with an optical interface.

6. The automatic positive disconnect circuit of claim 4 where said ring detector is a ring detector with optical interface.

7. The automatic positive disconnect circuit of claim 4 further comprising a low pass filter means, connected between said first control means and said first relay means for passing selective frequencies.

8. The automatic positive disconnect circuit of claim 1 wherein the second control means further comprises a switch operable to disable said second relay means responsive to said ring detector.

9. The automatic positive disconnect circuit of claim 8 wherein said ring detector is a ring detector with an optical interface.

10. An automatic positive disconnect circuit of claim 8 where the first control means comprises:
- a current detector for detecting any current that flows in response to said condition of said sensing means;
- a third relay means operable to enable said first relay means;
- a first switch means responsive to said current detector for enabling said third relay means by enabling the current detected by said current detector to flow to said first relay means;
- a capacitive component connected between a ground and input to the third relay means, for keeping said third relay means stable; a second switch for isolating said first relay means in response to a AC ring signal received by said two signal conducting lines; and
- a fourth switch means for isolating said first control means in response to a AC ring signal received by said two signal conducting lines.

11. The automatic positive disconnect circuit of claim 10 wherein said current detector is a current detector with an optical interface.

12. The automatic positive disconnect circuit of claim 10 where said ring detector is a ring detector with optical interface.

13. The automatic positive disconnect circuit of claim 10 further comprising a low pass filter means, connected between said first control means and said first relay means for passing selective frequencies.

* * * * *